United States Patent [19]

Barnett

[11] Patent Number: 5,202,378

[45] Date of Patent: Apr. 13, 1993

[54] PROCESS FOR PRODUCING AN EXTERIOR LATEX PAINT HAVING IMPROVED CHALK ADHESION

[75] Inventor: Gerald W. Barnett, Middleburg Hts., Ohio

[73] Assignee: The Glidden Company, Cleveland, Ohio

[21] Appl. No.: 868,176

[22] Filed: Apr. 14, 1992

Related U.S. Application Data

[63] Continuation of Ser. No. 666,625, Mar. 8, 1991, abandoned.

[51] Int. Cl.$^5$ .............................. C08L 31/00
[52] U.S. Cl. .................. 524/833; 524/458; 524/460; 524/832
[58] Field of Search ............... 524/556, 458, 832, 833, 524/460

[56] References Cited

U.S. PATENT DOCUMENTS 3,401,134  9/1968  Fantl et al. ........................ 524/832
3,637,563  1/1972  Christena ......................... 524/832

Primary Examiner—Joseph L. Schofer
Assistant Examiner—J. M. Reddick
Attorney, Agent, or Firm—Thomas M. Schmitz

[57] ABSTRACT

An aqueous, air-dry, emulsion protective coating composition, pigmented or unpigmented, and exhibiting excellent chalk adhesion without the need for external adhesion promoters, where the protective coating composition contains a film forming polymeric binder comprising emulsion copolymerized ethylenically unsaturated monomers including minor amounts of a fatty acid methacrylate or acrylate.

9 Claims, No Drawings

;# PROCESS FOR PRODUCING AN EXTERIOR LATEX PAINT HAVING IMPROVED CHALK ADHESION

This is a continuation of copending application Ser. No. 666,625, filed Mar. 8, 1991 and now abandoned.

Paint coatings are used protective surface coatings applied to substrates as a continuous film for decorative appearance as well as protection of the substrate. A paint coating can be pigmented or unpigmented but ordinarily comprises an organic polymeric binder, pigments and various paint additives. Exterior latex paints are air-dry consumer paints used to coat the exterior surfaces of buildings and ordinarily are based on an emulsion polymeric binder.

BACKGROUND OF THE INVENTION

Exterior surfaces, primarily wood siding, require repainting periodically to maintain appearance and protection of the substrate. Adhesion of newly applied paints to weathered surfaces, however, can be poor due to a weathered surface exhibiting a chalking condition. Chalking can occur after extended exposure to the weather due to deterioration of the old paint film which causes unprotected or dry unbound pigment particles to appear on the substrate surface.

Solvent based paints provide good adhesion to chalking surfaces since the organic solvent and binder can penetrate and wet the chalky surface. Latex paints, however, do not provide penetration or desired wetting of chalky surfaces regardless whether the polymeric binder type is acrylic, vinyl-acrylic, styrene acrylic or the like. If an alkyd is blended with latex binder, the chalk adhesion can be improved but other problems occur. For instance, the alkyd diminishes latex polymer properties and causes undesirable oxidative degradation thereby reducing the useful life of the paint film. Combinations of polymers, including aqueous dispersed polymers mixed with organic dispersed polymers are shown in U.S. Pat. No. 4,504,609, U.S. Pat. No. 4,529,765, U.S. Pat. No. 4,199,400, and U.S. Pat. No. 3,454,516. Similarly, U.S. Pat. No. 4,722,965 discloses a blend of emulsion polymers based on an adhesion promoting latex containing copolymerized amino-acrylate (WAM) monomer.

It now has been found that an emulsion latex binder copolymer containing minor amounts of copolymerized fatty acid acrylate or methacrylate such as lauryl or stearyl methacrylate provides the necessary chalk adhesion of the latex binder without the need for extraneous organic adhesion additives thereby eliminating the need for alkyd or other detracting adhesion additives. Thus, external adhesion promoters can be eliminated. These and other advantages of this invention will become more apparent by referring to the detailed description and illustrative examples.

SUMMARY OF THE INVENTION

Briefly, this invention pertains to consumer air-dry latex paints particularly exhibiting excellent chalk adhesion and particularly based on a polymeric film-forming binder comprising emulsion copolymerized ethylenically unsaturated monomers including 0.8% to 6% copolymerized fatty acid methacrylate or acrylate where methacrylates are preferred The aqueous dispersed polymeric binder can be combined wit opacifying pigment, non-opacifying pigment, and other paint additives to provide a pigmented air-dry consumer coating.

DETAILED DESCRIPTION OF THE INVENTION

The air-dry latex paint of this invention contains polymeric binder comprising emulsion copolymerize ethylenically unsaturated monomers including 0.8% to 6% of fatty acid acrylate or methacrylate such as lauryl methacrylate and/or stearyl methacrylate. Based on the weight of copolymerized ethylenic monomers, the polymeric binder comprises 0.8% to 6% fatty acid methacrylate or acrylate where preferred compositions contain 1% to 5% of copolymerized fatty acid acrylate or methacrylate having an aliphatic fatty acid chain comprising between 10 and 22 carbon atoms. Preferred copolymer compositions are based on copolymerized fatty acid methacrylate. Lauryl methacrylate and/or stearyl methacrylate are preferred and lauryl methacrylate is the most preferred monomer. Other useful fatty acid methacrylates include myristyl methacrylate, decyl methacrylate, palmitic methacrylate, oleic methacrylate, hexadecyl methacrylate, cetyl methacrylate and eicosyl methacrylate, and similar straight chain aliphatic methacrylate. Fatty acid methacrylates or acrylates typically comprise commercial fatty oils coreacted with methacrylic acid or acrylic acid to provide primarily the dominant fatty acid moiety methacrylate with minor amounts of other fatty acid acrylates or methacrylates. For example, commercial lauryl and stearyl methacrylates can comprise a typical commercial composition on a weight basis as follows:

| Lauryl methacrylate | |
|---|---|
| Lauryl methacrylate | 62% |
| Myristyl methacrylate | 25% |
| Decyl methacrylate | 4% |
| Hexadecyl methacrylate | 8% |
| Stearyl Methacrylate | |
| Stearyl methacrylate | 56% |
| Cetyl methacrylate | 30% |
| Eicosyl and other methacrylates | 14% |

As indicated, methacrylates comprising lauryl or stearyl methacrylates are preferred where lauryl methacrylate is most preferred.

In accordance with this invention, the fatty acid acrylate or methacrylate monomer, such as lauryl or stearyl methacrylate monomer, is added as an initial polymerization step or early in the polymerization of the ethylenic monomer. Thus, lauryl or stearyl methacrylate is completely added with the first 50% by weight of the total weight of ethylenic monomers copolymerized, preferably, the fatty acid monomer is added with the first 5% to 35% of the ethylenic monomers, most preferably with the first 5%–15% of the initial ethylenic monomers, in an initial copolymerization step followed by copolymerization of the remaining ethylenic monomers.

Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic monomers can include very minor amounts of acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid.

Accordingly, suitable film-forming latex binders typically include for instance vinyl and vinylidene polymers containing units such as vinyl acetate, vinyl chloride, vinylidene chloride, and the like; hydrocarbon polymers and copolymers containing ethylene or propylene units and oxygenated or halogenated derivatives of either, butadiene, oxygenated butadiene, isoprene, oxygenated isoprene, butadiene-styrene, butadiene vinyl toluene, isoprene-styrene and the like; acrylic polymer and copolymers containing units of acrylic acid, methacrylic acid, their esters, and acrylonitrile; vinylic hydrocarbon monomers reacted with unsaturated materials such as the reaction product of maleic acid with styrene; and, broadly, various other resinous rubber-like elastomeric latex polymers and copolymers of ethylenically unsaturated monomers and are polymers obtainable in stable aqueous latex form and are capable of coalescing into a pigmented film-forming binder when brushed, sprayed, or rolled onto a surface for curing at ambient outdoor temperatures. On a weight basis, the air-dry polymeric film forming binder comprises copolymerized ethylenic monomers between 0.8% and 6% fatty acid methacrylates having fatty acid chains containing 10 to 22 carbon atoms, preferably lauryl methacrylate and/or stearyl methacrylate, and between 65% and 93% acrylic monomer, with the balance being other ethylenic monomers. Preferred film-forming binders comprise 1% to 5% lauryl and/or stearyl methacrylate, between 94% and 98% acrylic monomer, with the balance being other ethylenic monomers.

To produce the film-forming emulsion polymer of this invention, the ethylenically unsaturated monomers are copolymerized in an aqueous polymerization medium by adding the ethylenic monomers to water along with surfactants and polymerizing catalysts or initiators as well as other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer additions. Suitable anionic surfactants include for example, salts of fatty acids such as sodium and potassium salts of stearic, pimelic, oleic, lauric, and tall oil acids, salts of sulfated fatty alcohols, salts of phosphoric acid esters of polyethoxylated long chain alcohols and phenols, etc. Preferred anionic surfactants include for example, alkylbenzene sulfonate salts such as sodium dodecylbenzene sulfonate and salts of hexyl, octyl, and higher alkyl diesters of 2-sulfosuccinic acid, etc. Suitable non-ionic surfactants include polyoxyethylene glycols reacted to a lyophilic compound to produce a hydrophile-lipophile balance (HLB) greater than 2 and preferably between about 10 and 15. Suitable non-ionic surfactants include for example, ethylene oxide condensation products reacted with t-octylphenol or nonylphenol and known as "Triton" surfactants, polymerized oxyethylene (IgepalCA), ethylene oxide reacted with organic acid (Emulfor), or organic acid reacted with polyoxyamylene ether of stearic or oleic acid esters (Tweens).

The film forming emulsion copolymer of this invention preferably has an average particle size between about .05 and 0.5 microns and preferably between .07 and .15 microns. The weight average molecular weight of the film-forming emulsion polymer can be between 100,000 and 1,000,000 and preferably between 200,000 and 400,000 as measured by GPC (gel permeation chromatography) according to ASTM methods D 3016-78, D 3536-76 and D 3593-80. The Tg or softening point of the emulsion polymer particles is preferably between 0° C. and 15° C. as calculated by the Fox equation based on the ratio of specific monomers or measured by ASTM 3418-75.

Film-forming emulsion polymers useful as film-forming binders according to this invention are ordinarily used with coalescing agents to assist the polymer particles to coalesce into a continuous film. Suitable coalescing agents include diethylene glycol monobutyl ether acetate, diethylene glycol monoethyl ether acetate, ethylene glycol monophenyl ether, or 2,2,4-trimethyl-1, 3-pentanediol monoisobutyrate, are helpful in modifying the properties of the film-forming latex binders to obtain desired coalescence of the film-forming polymer particles at the ambient coalescing temperature.

The latex paint of this invention contains opacifying pigments having a refractive index of at least about 1.8. Typical white opacifying pigments include rutile and anatase titanium dioxide, lithopone, zinc sulfide, lead titanate, antimony oxide, zirconium oxide, titanium calcium, white lead, titanium barium, zinc oxide, leaded zinc oxide, mixtures of the same, and like pigments. The preferred white inorganic opacifying pigment is rutile titanium dioxide having a weight average particle size between about 0.2 to 0.4 microns. Titanium yellow and like pigments having a high refractive index can be utilized as opacifying pigments as well as imparting tints to the paint. Although most opacifying pigments are white, all opacifying pigments having a high index of refraction above about 1.8 should be considered an opacifying pigment for the purpose of this invention regardless of its tinting (tinctorial) effect on the resulting paint film. Opacifying pigments comprise at least about 0% and up to 25% on a dry solids volume basis of the latex paint and preferably between about 2% to 20% on a dry solids volume basis of the latex paint.

The paint of this invention can further contain non-opacifying filler or extender pigments often referred to in the art as inerts and include clays, such as kaolinite clays, silica, talc, mica, wollastonite, barytes, slate flour, calcium carbonate, and other conventional filler pigments. All filler or extender pigments have fairly low Refractive Indices and can be described generally as pigment other than opacifying pigment. Filler and extender pigments generally should not be above 44 microns in effective diameter for paint purposes and generally are of particle size not larger than 25 microns for best finishes. Filler and extender pigments can comprise approximately 0% to 55% of the latex paint on a dry solids volume basis and advantageously between about 5% and 30% in accordance with higher pigment loading aspects of this invention.

The latex paint of this invention can contain tinctorial pigments which are pigmentary materials suitable for imparting a specific hue to the resulting latex emulsion paint. Tinctorial pigments generally include, for example, ferrite yellow oxide, ferric oxide, "brown" iron oxide (which is a blend of red, yellow, and black iron oxides), tan oxide of iron (which is a similar blend), raw sienna and burnt sienna, raw and burnt umber, chromium oxide green, phthalocyanine green (chlorinated copper phthalonitrile) the green iron salt of nitroso beta naphthol, copper, phthalonitrile blue, ultramarine blue, carbon black, lampblack, toluidine red, parachlor red, para tone (red, alkali resistant red, BON red, and maroon), cadmium reds and yellows, Watchung red, madder lake (red), Duratone red, carmine red, chrome yellow (lead chromate), chrome orange, Hansa yellows.

The manufacture of paint coatings involves the preparation of a polymeric binder, mixing of component materials, dispersing of pigments, and a thinning adjustment to commercial standards. High speed dispersers or dissolvers are typically used in the dispersing step to intersperse the pigments into a liquid phase containing other paint components. The binder and pigment dispersion can be thoroughly and uniformly mixed with raw batch ingredients by homogenizing the binders, pigmentary solids, plasticizers and other components to form a uniform blend. The polymeric binder further maintains the pigment in stable dispersion. Pigments ordinarily include opacifying pigments such as titanium dioxide, zinc oxide, leaded zinc oxide, titanium calcium, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower and the like can be added as desired.

The following examples further illustrate the merits of this invention.

EXAMPLE 1

A film-forming latex binder of this invention was produced as follows:

| Group | Reactant | Wt. Parts |
|---|---|---|
| A | Deionized water | 93.0 |
| | Hexanol polyethoxylate phosphate | 2.0 |
| | NH$_4$OH (conc.) | to adjust pH = 9.0 |
| | lauryl methacrylate (LMA)* | 1.0 |
| B | Na$_2$HPO$_4$ 12H$_2$O | 0.3 |
| C | Butyl acrylate | 2.5 |
| | Methyl methacrylate | 1.3 |
| D | (NH$_4$)$_2$ S$_2$O$_8$ | 0.3 |
| E | Butyl acrylate | 48.4 |
| | Methyl methacrylate | 44.8 |
| | acrylic acid | 1.0 |
| F | Na Amps (58%) | 1.72 |
| | Deionized water | 5.5 |
| G, I, K | Na formaldehyde sulfoxylate | 3 × .02 |
| | Deionized water | 3 × .2 |
| H, J | t-BHP - 70% | 2 × .026 |
| | Deionized water | 2 × .33 |
| L | NH$_4$OH (conc.) | to adjust pH = 8.5 |

*LMA Comprises 62% lauryl methacrylate, 25% myristyl methacrylate, 4% decyl methacrylate, and 8% hexadecyl methacrylate.

The above groups of reactants were processed according to the following procedure.

Procedure

1. Load water and surfactant and adjust pH to 9.0. Add lauryl methacrylate.
2. Add B, sparge with N$_2$, and heat to 75° C.
3. At 75° C., turn N$_2$ off, add C, and hold 10 mins.
4. Add D and hold 7 mins. or until exotherm peaks.
5. Start 4 hr. feeds of E and F.
6. When the monomer additions are complete, hold 10 mins., and then add G through K at 10 min. intervals.
7. Hold 15 mins., cool to room temperature, and adjust the pH to 8.5 with group L.

The above film-forming copolymer binder was combined with pigment and other paint additives as follows.

PAINT COMPOSITION

A paint coating composition comprising the following raw materials was produced using the foregoing polymer:

| Ingredient | Wt. Percent |
|---|---|
| Water | 30.02 |
| Propylene glycol | 2.00 |
| Titanium Dioxide (Type III) | 16.00 |
| Mica | 3.00 |
| Clay | 0.55 |
| Coalescing solvent | 1.20 |
| Latex (47% active) from above (Ex. 1) | 44.40 |

EXAMPLE 2

In the same manner described in Example 1, the monomers contained 1% stearyl methacrylate instead of lauryl methacrylate and were copolymerized as indicated in Example 1. The stearyl methacrylate comprised by weight 56% stearyl methacrylate, 30% cetyl methacrylate, and 14% eicosyl methacrylate. The foregoing copolymer binder was combined with pigment and other paint additives as described in Example 1.

ADHESION TESTS

Chalk adhesion of the paint compositions of Example 1 and 2, compared favorably to standard latex paints containing an external adhesion promoter additive. Chalk adhesion of Examples 1 and 2 indicated about 95% of the standard while Example 3 indicated about 85% of the chalk adhesion standard. In contrast, emulsion binder without the copolymerized lauryl or stearyl methacrylate exhibited only 40% chalk adhesion relative to the standard.

The chalk adhesion standard was based on the formulation in Example 1, but used a commercially available latex, which comprised a similar weight ratio of copolymerized monomers (50 butyl acrylate/50 methyl methacrylate) but did not include fatty acid methacrylate or acrylate. Average polymer particle size was about 0.088 microns. Chalk tests were run as per ASTM D-3359, modified for substrate, over a natural chalk with an ASTM rating of 4.

EXAMPLE 3

The following components were reacted together as indicated to produce a film-forming copolymer binder in accordance with this invention.

| | Reactant | Wt. (grms) |
|---|---|---|
| A. | Deionized water | 96.7 |
| | Hexanol polyethoxylate phosphate | 2.0 |
| | ammonium hydroxide | 0.6 |
| | sodium phosphate | 0.23 |
| B. | Lauryl methacrylate monomer | 1.0 |
| | methyl methacrylate | 1.3 |
| | butyl acrylate | 2.5 |
| C. | ammonium persulfate | 0.3 |
| | deionized water | 0.82 |
| D. | butyl acrylate | 49.5 |
| | methyl methacrylate | 44.7 |
| | acrylic acid | 1.0 |
| E. | deionized water | 10 |
| | sodium (amps) | 2 |

The above components were processed as follows.

Group A materials were added to the reactor with a mixing blade and heated to 75° C. Group B materials were added under nitrogen blanket and the reaction was held at 75° C. for 15 minutes. Group C was then added. After the exotherm occurred, Group D monomers and additives, Group E, were fed to the reactor for four hours and then held for another 15 minutes at 75° C. Thereafter, minor amounts of deionized water along with hydrosulfite (0.06 grms), t-butyl hydroperoxide (0.05 gms.), and sufficient ammonium hydroxide (3.14 gms) to adjust the pH to 9.5 to 10. The resulting latex was then cooled to room temperature.

The foregoing latex was compounded into a paint in the same manner as Example 1.

The resulting paint was applied to substrates and air dried at 70–76° F. for 2 hours to 7 days. The dried film was tested as follows with the indicated results

| Adhesion (ASTM D3359 - Modified for substrates) | | |
|---|---|---|
| Wood | 4B–5B | (0–5% failure) |
| galvanized | 4B–5B | (0–5% failure) |
| chalk (ASTM 4) | 4B–5B | (0–5% failure) |
| Contrast ratio (3 mil wet) | >0.98 | |
| Water resistance | pass | |

EXAMPLE 4

Further useful paints compounded with a fatty acid methacrylic-acrylic copolymer including exterior latex primers, exterior latex stains, gloss latex house paints and flat latex house paints have been made with this latex and have been found to make excellent practical paints which exhibit excellent chalk adhesion.

I claim:

1. A process for producing an aqueous, air-dry, protective surface coating containing opacifying pigment and adapted to air-dry at ambient temperatures, the coating composition containing an emulsion copolymer film-forming binder, where the coating composition is free of external adhesion promoters but exhibits chalk adhesion to weathered surfaces, the process steps comprising:

a two-step process for producing the emulsion copolymer binder by emulsion copolymerizing ethylenically unsaturated monomers in an aqueous polymerization medium where said ethylenically unsaturated monomers comprise on a weight basis between 0.8% and 6% of fatty acid methacrylate monomer selected form stearyl methacrylate, lauryl methacrylate, cetyl methacrylate, myristyl methacrylate or mixtures thereof, with the balance of said ethylenically unsaturated monomers being other ethylenic monomer other than said fatty acid methacrylate monomer, where said emulsion copolymer is produced by a two-step emulsion copolymerization process of:

a) said fatty acid monomer copolymerized with said other ethylenic monomers in the first step wherein between 5% and 50% by weight of said ethylenically unsaturated monomers are emulsion copolymerized, b) and the remaining said ethylenically unsaturated monomers copolymerized in the second step to produce said emulsion copolymer binder, said emulsion binder having a weight average molecular weight between 100,000 and 1,000,000 and an average copolymer particle size between about 0.05 and 0.5 microns, where the air-dry paint coating is adapted to coalesce and air-dry at ambient temperatures.

2. The process of claim 1 where the copolymer average particle size is between about 0.07 and 0.15 microns.

3. The process of claim 1 where the fatty acid methacrylate comprises lauryl methacrylate.

4. The process of claim 1 where the fatty acid methacrylate comprises stearyl methacrylate.

5. The process of claim 1 where the fatty acid methacrylate comprises a mixture of lauryl methacrylate and myristyl methacrylate.

6. The process of claim 1 where the fatty acid methacrylate comprises a mixture of stearyl methacrylate and cetyl methacrylate.

7. The process of claim 1 where the fatty acid methacrylate monomer is copolymerized in the first step with 5% to 35% by weight of said ethylenically unsaturated monomers copolymerized.

8. The process of claim 1 where the fatty acid methacrylate monomer is copolymerized in the first step with 5% to 15% of said ethylenically unsaturated monomers copolymerized.

9. The process of claim 1 where the emulsion copolymer comprises copolymerized monomers by weight between 1% and 5% said fatty acid methacrylate monomer, between 65% and 93% acrylic monomer, with the balance being other ethylenic monomer.

* * * * *